US010544619B2

(12) United States Patent
Hall et al.

(10) Patent No.: US 10,544,619 B2
(45) Date of Patent: Jan. 28, 2020

(54) SELF-CLEANING WINDOW BLINDS WITH PHOTOCATALYTIC MATERIAL

(71) Applicants: David R. Hall, Provo, UT (US); Terrece Pearman, Draper, UT (US); Emily Brimhall, Alpine, UT (US)

(72) Inventors: David R. Hall, Provo, UT (US); Terrece Pearman, Draper, UT (US); Emily Brimhall, Alpine, UT (US)

(73) Assignee: Hall Labs LLC, Provo, UT (US)

( * ) Notice: Subject to any disclaimer, the term of this patent is extended or adjusted under 35 U.S.C. 154(b) by 115 days.

(21) Appl. No.: 15/431,133

(22) Filed: Feb. 13, 2017

(65) Prior Publication Data
US 2018/0230740 A1 Aug. 16, 2018

(51) Int. Cl.
| E06B 9/386 | (2006.01) |
| E06B 9/322 | (2006.01) |
| E06B 9/323 | (2006.01) |
| B01J 35/00 | (2006.01) |
| B08B 7/00 | (2006.01) |
| B01J 23/14 | (2006.01) |
| B01J 27/24 | (2006.01) |
| B01J 37/02 | (2006.01) |
(Continued)

(52) U.S. Cl.
CPC ............ *E06B 9/322* (2013.01); *B01J 21/063* (2013.01); *B01J 23/06* (2013.01); *B01J 23/14* (2013.01); *B01J 23/26* (2013.01); *B01J 23/30* (2013.01); *B01J 23/34* (2013.01); *B01J 23/66* (2013.01); *B01J 23/80* (2013.01); *B01J 23/835* (2013.01); *B01J 27/24* (2013.01); *B01J 35/004* (2013.01); *B01J 37/0215* (2013.01); *B08B 7/0057* (2013.01); *E06B 9/323* (2013.01); *E06B 9/386* (2013.01); *A47L 2601/10* (2013.01); *E06B 2009/247* (2013.01); *E06B 2009/3222* (2013.01)

(58) Field of Classification Search
CPC . E06B 9/322; E06B 9/38; E06B 9/386; E06B 2009/1505; E06B 2009/1511; A47L 4/00; A47L 4/04; A47L 2601/10; B01J 35/004; B08B 7/0057
See application file for complete search history.

(56) References Cited

U.S. PATENT DOCUMENTS 2,068,977 A * 1/1937 Dodge ................ E06B 9/386
156/65
2,091,579 A * 8/1937 Balthasar ............. E06B 9/386
160/173 R
(Continued)

*Primary Examiner* — Johnnie A. Shablack

(57) ABSTRACT

A self-cleaning window blind includes a thin layer of photocatalytic material on at least one surface of the slats. The window blind includes an ultraviolet light source which directs ultraviolet light onto the photocatalytic material. Consequently, the window blind is not dependent on available sunlight. The ultraviolet light source is located in either the headrail or the bottom rail of the window blinds. Upon exposure to ultraviolet light, organic material on the slats which may include dust, grease, or microorganisms, is converted to carbon dioxide and water. One or both of the horizontal edges of the slats may include a lip which collects water formed by the photocatalytic reaction. In some embodiments, the slats are slightly convex. This shape may inhibit water from collecting in droplets on the slat and help direct the water towards the lip. Consequently, water spots are not created on the slats.

20 Claims, 6 Drawing Sheets

(51) Int. Cl.
  *B01J 23/835*  (2006.01)
  *B01J 23/66*  (2006.01)
  *B01J 23/80*  (2006.01)
  *B01J 23/34*  (2006.01)
  *B01J 23/30*  (2006.01)
  *B01J 23/26*  (2006.01)
  *B01J 23/06*  (2006.01)
  *B01J 21/06*  (2006.01)
  *E06B 9/24*  (2006.01)

(56) References Cited

U.S. PATENT DOCUMENTS

| | | | | |
|---|---|---|---|---|
| 2,165,292 A * | 7/1939 | Morse | E06B 9/306 | 160/173 R |
| 4,064,670 A * | 12/1977 | Lichtenwald | E06B 7/082 | 52/473 |
| 4,096,903 A * | 6/1978 | Ringle, III | E06B 9/264 | 160/107 |
| 4,434,834 A * | 3/1984 | Ennes | E06B 9/386 | 160/166.1 |
| 4,452,024 A * | 6/1984 | Sterriker | E06B 7/082 | 454/277 |
| 4,877,077 A * | 10/1989 | Ebert | E06B 9/386 | 160/236 |
| 5,102,598 A * | 4/1992 | Chen | B29B 9/14 | 160/236 |
| 5,119,871 A * | 6/1992 | Schwaegerle | B32B 27/20 | 160/236 |
| 5,194,209 A * | 3/1993 | Schwaegerle | B32B 27/20 | 264/132 |
| 5,194,310 A * | 3/1993 | Lenderink | B32B 21/14 | 428/90 |
| 5,496,630 A * | 3/1996 | Hawrylko | B32B 27/20 | 428/328 |
| 5,573,054 A * | 11/1996 | Swopes | E06B 9/303 | 160/178.3 |
| 5,714,855 A * | 2/1998 | Domel | E06B 9/307 | 318/280 |
| 5,718,273 A * | 2/1998 | Best | E06B 9/303 | 160/166.1 |
| 5,760,558 A * | 6/1998 | Popat | E06B 9/32 | 160/168.1 R |
| 5,883,480 A * | 3/1999 | Domel | E06B 9/307 | 318/282 |
| 5,919,422 A * | 7/1999 | Yamanaka | A61L 2/232 | 422/121 |
| 6,015,002 A * | 1/2000 | Biro | B32B 27/304 | 428/121 |
| 6,156,211 A * | 12/2000 | Gonzalez-Martin | B01D 53/864 | 204/157.9 |
| 6,228,480 B1 * | 5/2001 | Kimura | B01J 35/002 | 106/287.13 |
| 6,466,298 B1 * | 10/2002 | Fix | B32B 17/10 | 349/16 |
| 6,497,266 B1 * | 12/2002 | Palmer | E06B 9/386 | 156/308.2 |
| 6,528,782 B1 * | 3/2003 | Zhang | B60J 3/04 | 250/205 |
| 6,743,749 B2 * | 6/2004 | Morikawa | B01J 21/06 | 423/239.1 |
| 6,812,662 B1 * | 11/2004 | Walker | E06B 9/322 | 136/243 |
| 6,835,688 B2 * | 12/2004 | Morikawa | B01J 21/063 | 502/200 |
| 6,877,548 B1 * | 4/2005 | Chartier | E06B 9/36 | 160/10 |
| 7,714,335 B2 * | 5/2010 | Beckers | H01L 51/5237 | 257/88 |
| 7,743,815 B2 * | 6/2010 | Clauss | E06B 9/15 | 160/133 |
| 8,273,425 B2 * | 9/2012 | Eldering | B01J 35/004 | 428/34.4 |
| 8,471,464 B2 * | 6/2013 | Yamada | E06B 9/303 | 313/504 |
| 8,586,215 B2 * | 11/2013 | Hartig | C03C 17/36 | 428/701 |
| 9,063,287 B2 * | 6/2015 | Nagahama | E06B 9/24 | |
| 9,080,376 B2 * | 7/2015 | Pellini | E06B 9/386 | |
| 9,122,055 B2 * | 9/2015 | Aizenberg | E06B 9/24 | |
| 9,169,690 B2 * | 10/2015 | Blair | E06B 9/24 | |
| 9,192,267 B2 * | 11/2015 | Tsibulevskiy | A47K 3/38 | |
| 9,210,784 B2 * | 12/2015 | Antoniazzi | A61L 2/10 | |
| 9,376,853 B2 * | 6/2016 | Hartig | C03C 17/36 | |
| 9,470,040 B2 * | 10/2016 | Hall | E06B 9/303 | |
| 9,510,711 B2 * | 12/2016 | Tsibulevskiy | A47K 3/38 | |
| 9,588,267 B2 * | 3/2017 | Nagahama | B32B 3/30 | |
| 9,719,644 B2 * | 8/2017 | Sekido | E06B 9/28 | |
| 9,778,534 B2 * | 10/2017 | Tran | G02F 1/155 | |
| 9,809,003 B2 * | 11/2017 | Gower | E06B 1/60 | |
| 9,891,357 B2 * | 2/2018 | Boman | B05D 1/36 | |
| 9,955,825 B2 * | 5/2018 | Tsibulevskiy | A47K 3/281 | |
| 9,964,676 B2 * | 5/2018 | Nagahama | G02B 5/045 | |
| 10,006,598 B2 * | 6/2018 | Sekido | E06B 9/28 | |
| 10,184,623 B2 * | 1/2019 | Vasylyev | F21V 3/06 | |
| 10,287,818 B2 * | 5/2019 | Nishida | E06B 9/32 | |
| 2002/0091178 A1 * | 7/2002 | Amin-Javaheri | C08L 27/06 | 524/13 |
| 2003/0006015 A1 * | 1/2003 | Lin | B60J 1/2011 | 160/370.23 |
| 2003/0162035 A1 * | 8/2003 | Talpaert | A47L 1/00 | 428/432 |
| 2003/0168183 A1 * | 9/2003 | Franco | E06B 9/386 | 160/166.1 |
| 2004/0129167 A1 * | 7/2004 | Sprague | E06B 3/02 | 104/89 |
| 2004/0149307 A1 * | 8/2004 | Hartig | C03C 17/34 | 134/1 |
| 2004/0163774 A1 * | 8/2004 | Nien | E06B 9/307 | 160/168.1 P |
| 2004/0261957 A1 * | 12/2004 | Chen | E06B 9/386 | 160/236 |
| 2006/0152137 A1 * | 7/2006 | Beteille | B32B 17/10036 | 313/503 |
| 2007/0264494 A1 * | 11/2007 | Krisko | B01J 35/004 | 428/336 |
| 2008/0230187 A1 * | 9/2008 | Caron | A47H 2/00 | 160/38 |
| 2008/0236764 A1 * | 10/2008 | Cheng | E06B 9/322 | 160/84.02 |
| 2008/0271856 A1 * | 11/2008 | Paulussen | E06B 9/386 | 160/127 |
| 2012/0300306 A1 * | 11/2012 | Nagahama | G02B 1/118 | 359/601 |
| 2013/0240161 A1 * | 9/2013 | Huang | A47H 99/00 | 160/236 |
| 2013/0250403 A1 * | 9/2013 | Maeda | B01J 21/063 | 359/350 |
| 2014/0020852 A1 * | 1/2014 | Thielemann | F04D 25/0606 | 160/127 |
| 2014/0111851 A1 * | 4/2014 | Lin | E06B 9/386 | 359/359 |
| 2014/0340729 A1 * | 11/2014 | Tajima | G02F 1/1523 | 359/266 |
| 2015/0013920 A1 * | 1/2015 | Mullet | E06B 9/303 | 160/7 |
| 2015/0082702 A1 * | 3/2015 | Walter | E06B 9/04 | 49/56 |
| 2015/0204127 A1 * | 7/2015 | Kashani | E06B 3/78 | 29/434 |
| 2016/0025288 A1 * | 1/2016 | Vasylyev | F21V 3/06 | 359/595 |
| 2016/0060954 A1 * | 3/2016 | Nishida | E06B 9/32 | 160/176.1 R |
| 2016/0158738 A1 * | 6/2016 | Ozaki | B01J 35/02 | 502/159 |
| 2016/0158739 A1 * | 6/2016 | Noel | B01J 21/00 | 428/201 |

(56) References Cited

U.S. PATENT DOCUMENTS

| | | | |
|---|---|---|---|
| 2016/0178164 A1* | 6/2016 | Nishida | E06B 9/303 |
| | | | 359/596 |
| 2017/0097555 A1* | 4/2017 | Lattes | E06B 9/24 |
| 2017/0146207 A1* | 5/2017 | Nishinaka | F21S 11/00 |
| 2017/0165947 A1* | 6/2017 | Murakami | G02B 5/208 |
| 2017/0176656 A1* | 6/2017 | Nagahama | B32B 3/30 |
| 2017/0183256 A1* | 6/2017 | Myli | E06B 3/6715 |
| 2018/0095209 A1* | 4/2018 | Hakuta | B32B 7/02 |
| 2018/0186217 A1* | 7/2018 | Lemmer | E06B 3/6715 |

* cited by examiner

SELF-CLEANING WINDOW BLINDS WITH PHOTOCATALYTIC MATERIAL

BACKGROUND

Field of the Invention

This disclosure relates to window blinds, specifically self-cleaning window blinds.

Background of the Invention

Window blinds include slats which create an increased surface area relative to window shades. The slats are difficult to clean without taking the window blind out of the window, cleaning it, then remounting it. Consequently, the slats collect dust, grease, microorganisms, and other organic material on their surface. This is both unsightly and may also be insanitary. In some settings, for example, healthcare facilities, the slats may be a source of nosocomial infection.

Some self-cleaning window blinds are available which require sunlight to initiate a photocatalytic reaction which cleans the blinds. However, these window blinds do not clean themselves when used indoors or away from sunlight. A window blind with slats that are self-cleaning without the need for direct sunlight is needed.

BRIEF SUMMARY OF THE INVENTION

We disclose a window blind that may self-clean through the use of ultraviolet light on a photocatalytic surface. Since the window blind has a built-in light source, it does not require exposure to sunlight in order to self-clean. Consequently, the self-cleaning function of the disclosed window blinds may be used indoors and without the presence of sunlight. As such, the self-cleaning process may also occur at night or when the blinds are closed, and thus not exposed to sunlight. In one embodiment of the disclosed window blind, the ultraviolet light source may be contained within a headrail. In this embodiment, the ultraviolet light source directs the ultraviolet light downward toward the slats. In another embodiment, the ultraviolet light source may be contained in a bottom rail. In this embodiment, the ultraviolet light source may direct the ultraviolet light upward toward the slats. In some embodiments in which the ultraviolet light source is positioned within the bottom rail, each slat may be sequentially exposed to ultraviolet light as the window blind is raised. The slats stack up from the bottom up as the blind is raised with the lowest slat that is not stacked being positioned nearest the ultraviolet light source in the bottom rail. This lowest slat is exposed to the ultraviolet light before being stacked as the window blind raises slightly higher. The ultraviolet light is then directed towards the next highest slat. The process may be repeated until the top slat has been illuminated.

The slats of the window blinds may be composed of a substrate with a thin layer of photocatalytic material on at least one surface of each slat. The photocatalytic material may include, but is not limited to, titanium dioxide, stannous oxide, and/or zinc oxide. The photocatalytic surface may also be doped with a variety of metal oxides or other materials, including but not limited to silver, iron, cobalt, chromium, manganese, nitrogen, or tungsten trioxide. The surface may also be either hydrophilic or hydrophobic. The slats may also have one or two lips along the horizontal edges of the slats. In some embodiments of the invention, the slats may also be convex such that any water that may collect on the surface of the slats may be directed towards the one or two lips where it may collect.

The headrail of the window blind may also contain at least one gear, a motor, and a battery connected to the motor. In some embodiments of the invention, a controller may also be included, which may have a memory for storing program code. A user may control the self-cleaning function of the window blind through wired or wireless means using program code stored in the memory.

BRIEF DESCRIPTION OF THE DRAWINGS

FIG. 5A shows the slats fully extended and FIG. 5B shows the window blind in the process of being raised.

DETAILED DESCRIPTION OF THE INVENTION

Definitions

Figure 1:
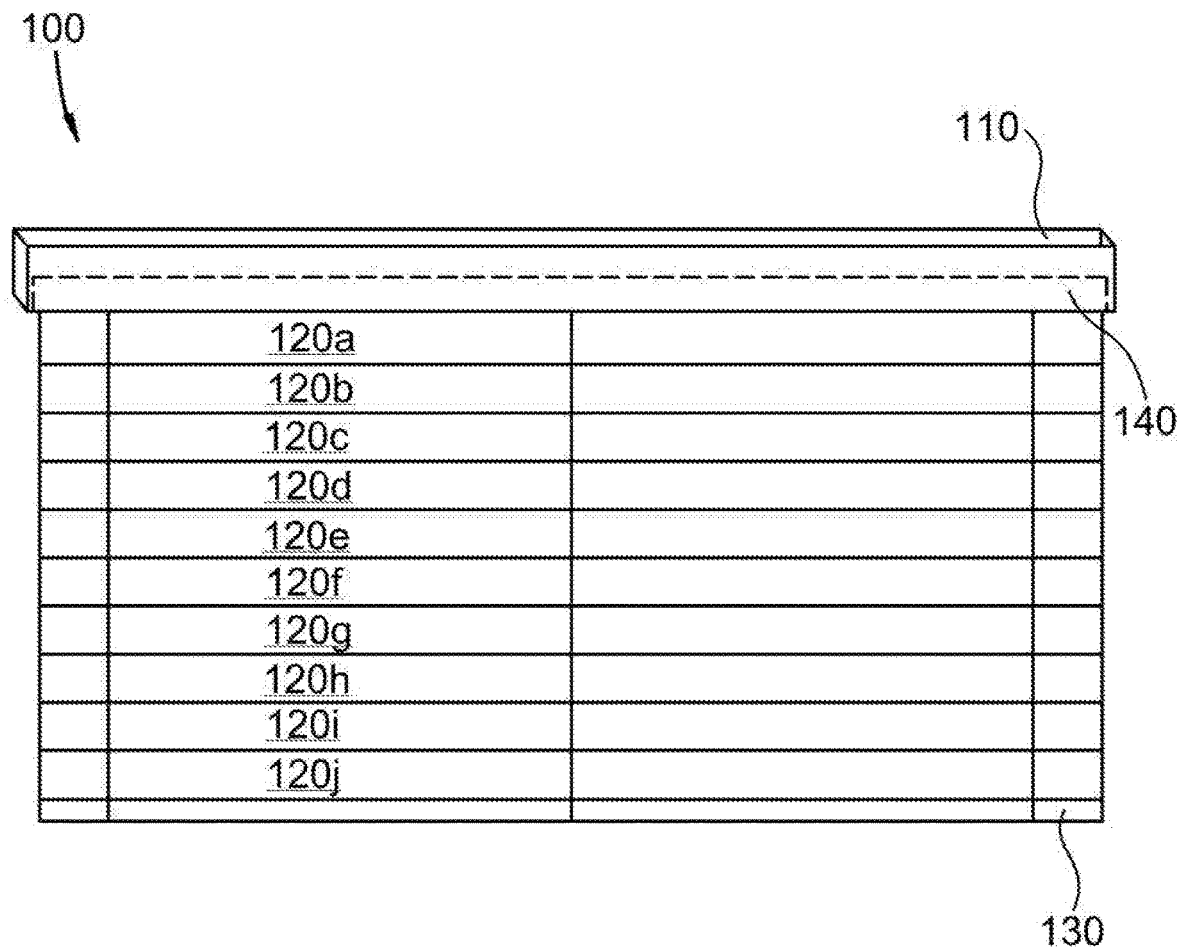
FIG. 1 illustrates a window blind according to an embodiment of the disclosure with an ultraviolet light source in the headrail.

Window blind, as used herein, means a blind that covers an opening in a building, including a window or door.

While this invention is susceptible of embodiment in many different forms, there are shown in the drawings, which will herein be described in detail, several specific embodiments with the understanding that the present disclosure is to be considered as an exemplification of the principals of the invention and is not intended to limit the invention to the illustrated embodiments.

We disclose a window blind that may self-clean through a reaction of ultraviolet light and a photocatalytic material on a substrate. The photocatalytic material may be applied to a substrate on at least one surface of the slats of the window blind. The photocatalytic material deposited on the substrate may include, but is not limited to, titanium dioxide, stannous oxide, and zinc oxide. When ultraviolet light shines on the photocatalytic material, an electron is excited from the valence band of the metal to a conduction band. This allows the photocatalytic material to either reduce an oxygen molecule to a superoxide molecule or oxidize a hydroxide anion to a hydroxyl radical. Both superoxide and hydroxyl radicals are very reactive, which allows them to break down pollutants or organic material into carbon dioxide and water. In reducing and oxidizing the hydroxide and the oxygen, the photocatalytic material is regenerated and can be reused for future reactions.

The efficiency of the photocatalytic reaction process can be improved by doping the surface with a metal cation or other materials. Consequently, in some embodiments, the photocatalytic material on the slats includes a material that has been doped with metal cations or other materials. In some embodiments of the invention, the photocatalytic film may be doped with other substances which may include, but are not limited to, silver, iron, cobalt, chromium, manganese, nitrogen, or tungsten trioxide. The film may also be either substantially hydrophilic or substantially hydrophobic.

In one embodiment of the invention, the window blind may consist of a plurality of window slats, each of which may include a lip along one of the horizontal edges of the slats. The lip may collect water that is formed from the photocatalytic reaction so that water marks and spots are not left on the slats after cleaning. The slats may also be slightly convex so that water may be directed toward the lip rather than collecting along the surface of the slats.

Some embodiments of the invention may also have a second lip along the second horizontal edge of the plurality of slats. Consequently, these slats have two lips, one on each horizontal edge of each slat. In this embodiment, the plurality of slats may also be convex such that any water produced from the reaction on the surface of the slats may collect in either one or both lips. The water may then evaporate from the lips thus avoiding water marks or spots on the blinds.

The slats may include a substrate, upon which a photocatalytic material may be deposited. The substrate may include a hydrocarbon polymer or copolymer, a thin layer of glass, or other material to which the photocatalytic material may be applied. The photocatalytic material may be applied to the substrate by printing, spraying, or other mechanisms known in the art.

In some embodiments, the window blind may have a headrail that may contain an ultraviolet light source, at least one gear, a motor, and a battery. The battery may be connected to the motor, which may be operably connected to and power the one or more gears. The battery may also be connected to and power the ultraviolet light source. The ultraviolet light source may direct ultraviolet light downward onto the plurality of slats in order to activate the photocatalytic reaction.

In another embodiment of the invention, the ultraviolet light source may be contained in a bottom rail. In embodiments in which the ultraviolet light source is positioned in the bottom rail, the ultraviolet light may be directed toward one slat at a time, from the bottom to the top slat, as the blind is raised. The gear mechanism may raise the blind slowly. In some embodiments, the gear mechanism may be powered by the battery. As each slat is stacked along the bottom rail, the slat above it may be illuminated with ultraviolet light. Then, the illuminated slat may be stacked along the bottom rail with the lower slats as the blind raises slightly higher. The next highest slat may then be illuminated with ultraviolet light until, eventually, the top slat has been illuminated. The photocatalytic reaction may convert organic material on the slats to carbon dioxide and water as each slat is illuminated.

Any embodiment of the disclosed window blinds may include a controller. The controller may have a memory for storing program code. The program code may enable a user to input specific times of day and/or dates that the user wishes the self-cleaning process to occur. For example, the user may choose a time when the occupants of the dwelling are asleep to initiate self-cleaning. This timing scenario reduces distraction which may be caused by the cleaning process and may reduce the chance of unwanted skin or eye exposure to ultraviolet light. Alternatively, the user may select a time for cleaning during which the dwelling is unoccupied, for example, during the work day.

The program code may enable a user to input a wavelength range and intensity of the ultraviolet light emitted by the ultraviolet light source. In some embodiments, the program code may enable a user to input the length of time the self-cleaning process occurs. Consequently, light cleaning sessions may be performed periodically between more thorough cleaning sessions.

The input mechanism from the user to the controller may be wired or wireless. In some embodiments, the user may select input data using a mobile device. In other embodiments, the user may input data manually using a keypad that is connected through wires or wirelessly to the controller in the headrail.

Referring now to the drawings, FIG. 1 shows window blind 100 which is an embodiment of the disclosed window blind. Window blind 100 includes headrail 110, slats 120*a-j*, and bottom rail 130. Slats 120*a-j* include a substrate at least on the side of slats 120*a-j* which are nearest the adjacent room. The substrate is coated with a film of photocatalytic material as described in detail elsewhere herein. In this embodiment, headrail 110 includes ultraviolet light source 140 which is positioned inside headrail 110. Ultraviolet light source 140 directs ultraviolet light onto slats 120*a-d* to activate the photocatalytic reaction. The photocatalytic reaction may convert organic material, including dust, grease, and microorganisms, to carbon dioxide and water.

Figure 2:
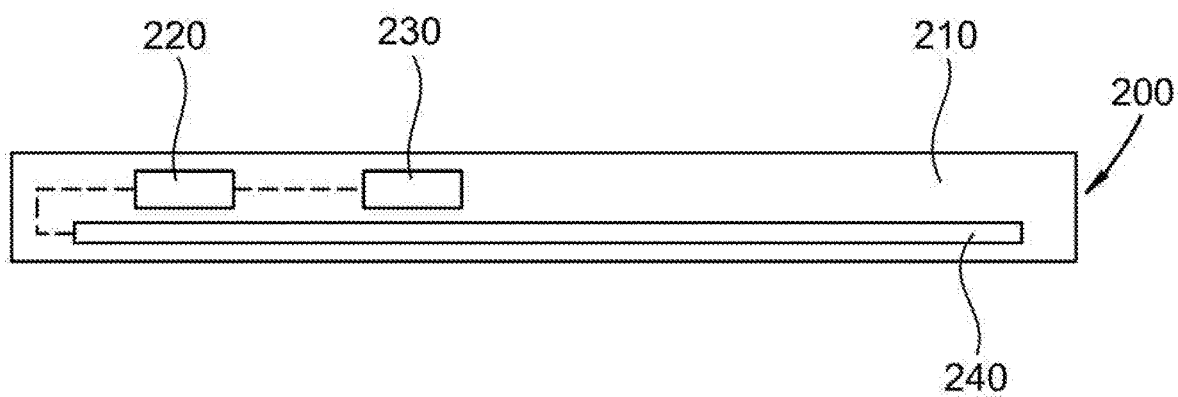
FIG. 2 illustrates an embodiment of a headrail within an embodiment of the disclosed window blind shown from below the headrail.

FIG. 2 shows an embodiment of the invention 200 in which a light source is included in the headrail. Headrail 210 includes ultraviolet light source 240 and gear box 230, both of which are connected to controller 220. Ultraviolet light source 240 may be direct ultraviolet light onto slats of a window blind during self-cleaning. Controller 220 may include a memory. Program code may be stored in the memory to control the timing and other features of the self-cleaning process.

Figure 3A:
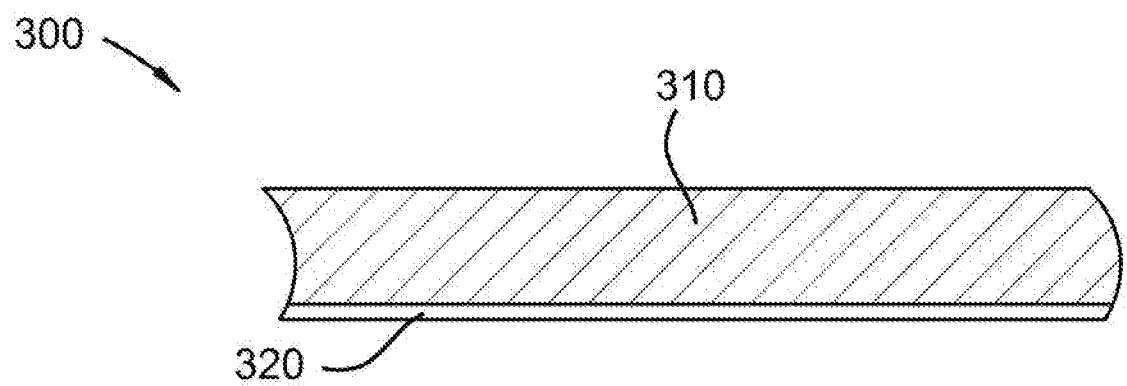
FIG. 3A illustrates an embodiment of a slat which may be included in a window blind according to the disclosure.

FIG. 3A is a close-up view of slat 300 which has a film of photocatalytic material 310 applied on at least one side of slat 300. Slat 300 also includes lip 320 for collecting water that may form on the surface of slat 300 as a result of the photocatalytic reaction. In the embodiment of FIG. 3A, slat 300 is shown slightly convex so that the water that forms as a product of the photocatalytic reaction may be directed toward lip 320 rather than pool or bead up on slat 300 leaving water spots.

Figure 3B:
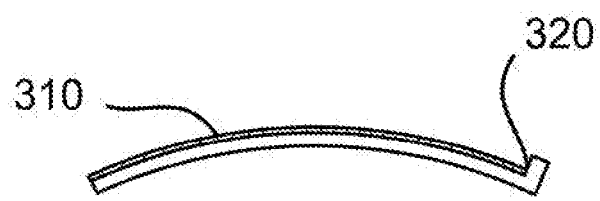
FIG. 3B illustrates a cross sectional view of the slat of FIG. 3A.

FIG. 3B shows a cross-sectional view of slat 300 which was originally presented in FIG. 3A. Photocatalytic material is shown as a thin film on the surface of slat 300. Lip 320 is shown on one horizontal edge of slat 300. Furthermore, slat 300 is shown slightly convex with an arc from one horizontal edge to the other.

Figure 4A:
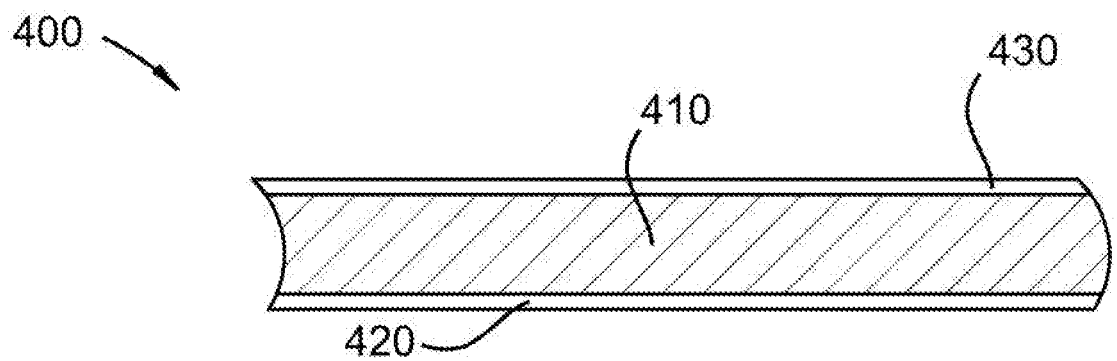
FIG. 4A illustrates an embodiment of a slat which may be included in a window blind according to the disclosure.

FIG. 4A is a close-up view of slat 400 which is another embodiment of a slat which may be included in the disclosed window blind. Similar to slat 300 of FIG. 3A, slat 400 includes photocatalytic film 410 on at least the surface facing the viewer. Slat 400 includes two lips, lips 420 and 430, which are located on each of the two horizontal edges of slat 400. This embodiment provides two directions for water created by the photocatalytic reaction to flow away from the center of slat 400 and into a lip. Consequently, water may collect in either or both of lips 420 and 430 rather than collecting on the surface of slat 400. Similar to slat 300 of FIG. 3A, slat 400 is also shown with a slightly convex surface to encourage water to collect in lips 420 and 430.

Figure 4B:
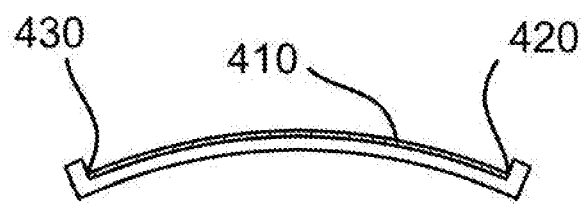
FIG. 4B illustrates a cross sectional view of the slat of FIG. 4A.

FIG. 4B shows a cross sectional view of slat 400 as originally presented in FIG. 4A. FIG. 4B shows that photocatalytic material 410 is present on slat 400 as a thin film. The convex curvature of slat 400 is shown with an arc between lips 420 and 430.

Figure 5A:
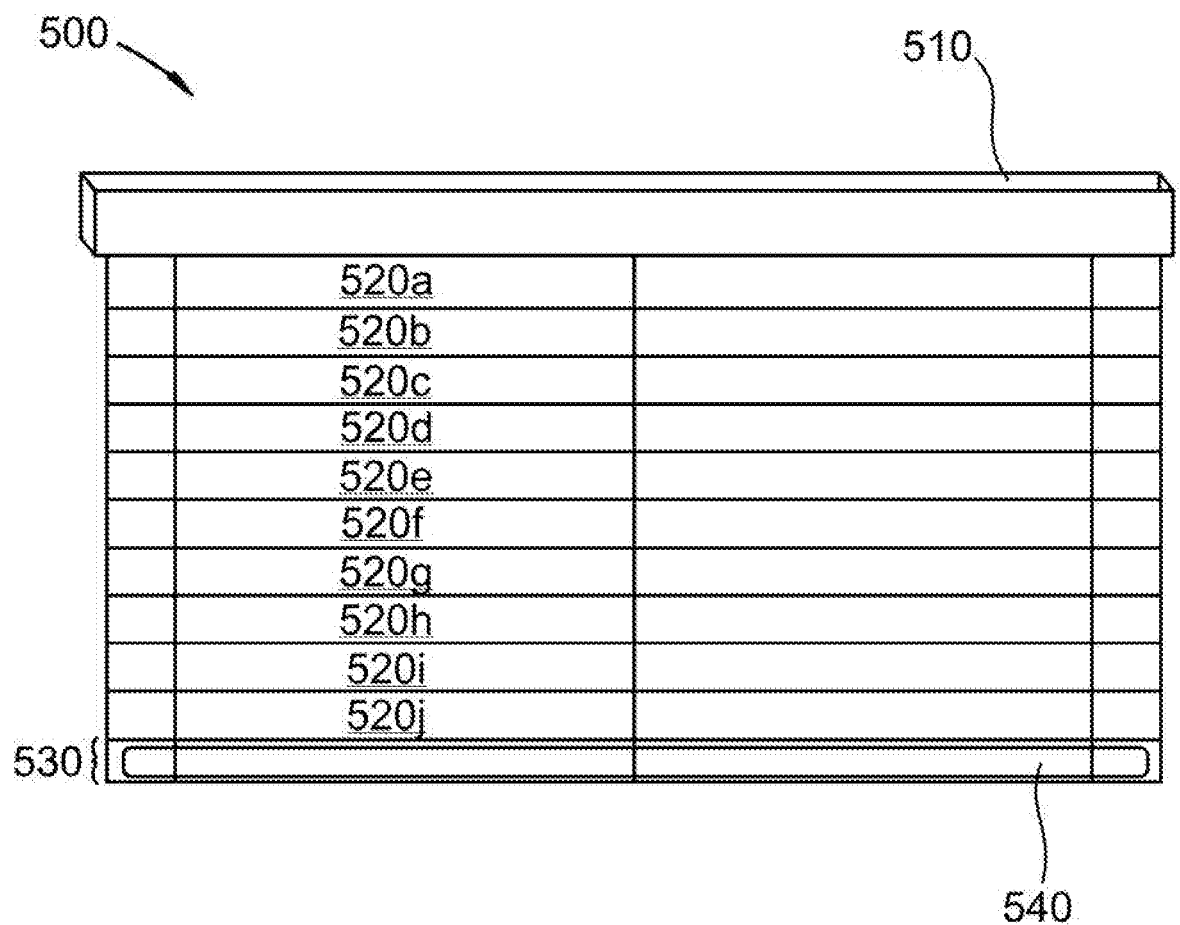
FIGS. 5A and 5B illustrate a window blind according to an embodiment of the disclosure with an ultraviolet light source in the bottom rail.

FIG. 5A shows window blind 500, which is another embodiment of a window blind according to the present disclosure. Window blind 500 includes headrail 510 and slats 520a-j. FIG. 5A shows slats 520a-j fully extended. Similar to other embodiments disclosed herein, slats 520a-j include a photocatalytic material which is present as a thin layer on a substrate on each of slats 520a-j. Window blind 500 further includes bottom rail 530. In this embodiment, ultraviolet light source 540 is within bottom rail 530 rather than in headrail 510.

Figure 5B:
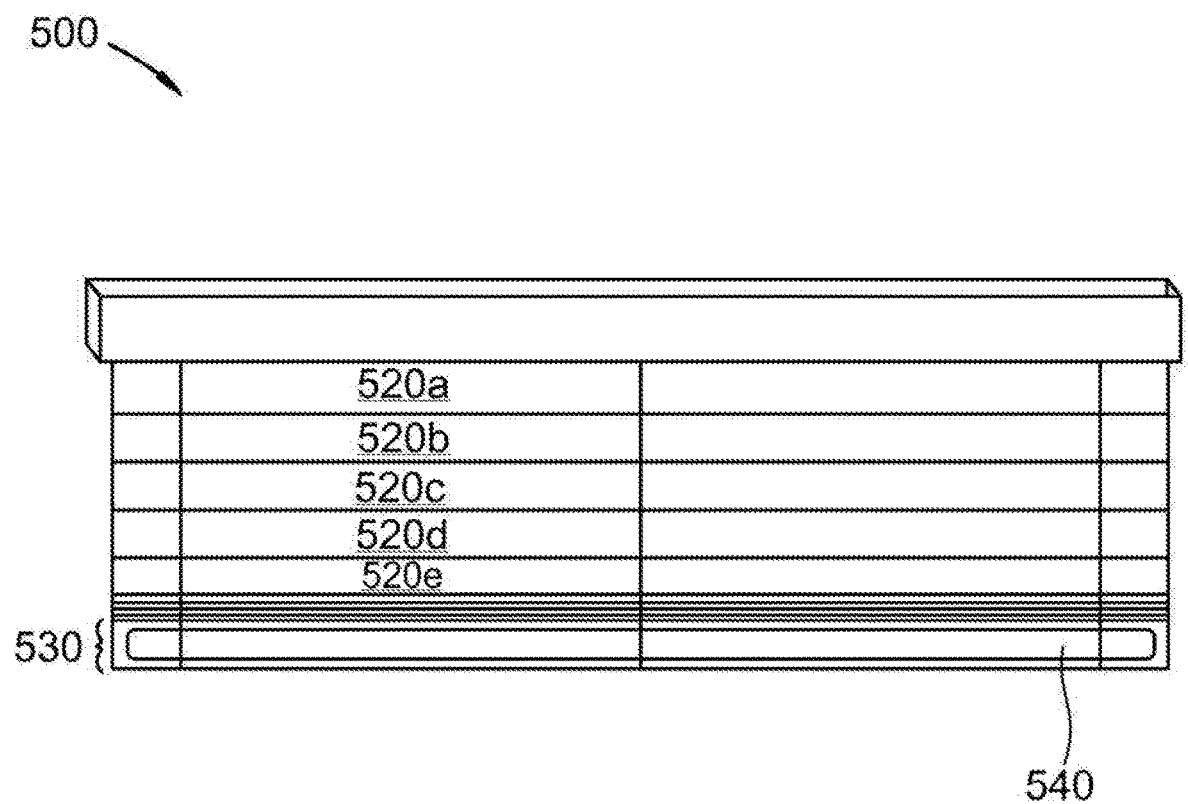

FIG. 5B shows window blind 500 as originally presented in FIG. 5A with slats 520f-j in a stacked position as window blind 500 is in the process of raising upward. As each of slats 520a-j are compiled into a stack adjacent to bottom rail 530, the slat that is above the stack is closest to ultraviolet light source 540. Consequently, as window blind 500 gradually raises, each of slats undergoes a photocatalytic reaction in response to ultraviolet light on the photocatalytic material on its surface. As shown in FIG. 5B, slat 520e is undergoing self-cleaning.

Figure 6:
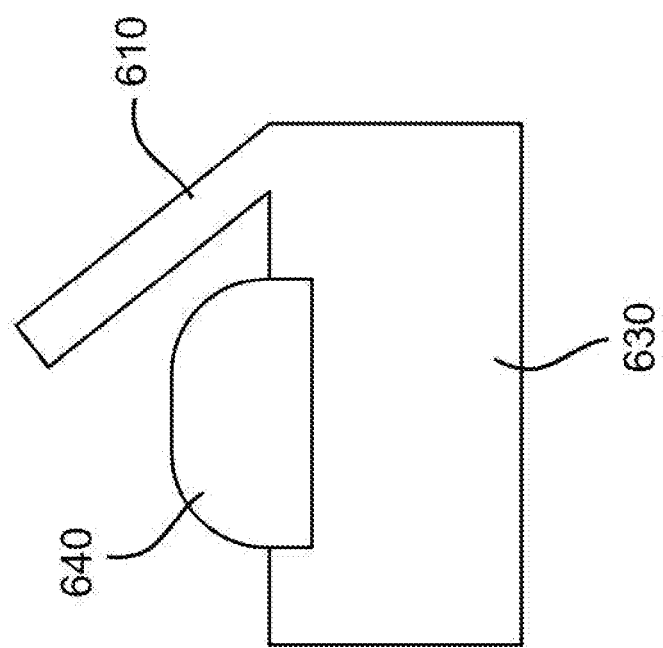
FIG. 6 illustrates a cross-sectional view of an embodiment of a bottom rail including an ultraviolet light source and shield according to the disclosure.

FIG. 6 is a cross-sectional view of bottom rail 600, which is an embodiment of a bottom rail which may be included in the disclosed window blind. In this embodiment, rail 630 includes ultraviolet light source 640 embedded within it. Shield 610 is included in this embodiment. Shield 610 is angled over ultraviolet light source 640 so that the ultraviolet light may reach the adjacent slat but not items or persons within the adjacent room. Thus, shield 610 is a safety feature that may be included in some embodiments. Shield 610 may be constructed from a variety of materials known in the art which are known to block ultraviolet light including, but not limited to, polycarbonate, acrylic, and/or polyethylene glycol-co-1,4-cyclohexanedimethanol terephthalate) (PETE).

While specific embodiments have been illustrated and described above, it is to be understood that the disclosure provided is not limited to the precise configuration, steps, and components disclosed. Various modifications, changes, and variations apparent to those of skill in the art may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art that changes may be made to the details of the above-described embodiments without departing from the underlying principles of the disclosure herein.

The invention claimed is:

1. A window blind comprising:
a plurality of slats, each of the plurality of slats comprising:
a first horizontal edge and a second horizontal edge, wherein the first and second horizontal edges are substantially parallel with a horizontal axis of each of the plurality of slats;
a lip, along the first horizontal edge of each of the plurality of slats;
a substrate;
a film of photocatalytic material, wherein the film is disposed on the substrate;
a headrail, the headrail comprising:
an ultraviolet light source, wherein the ultraviolet light source directs ultraviolet light downward toward the plurality of slats to activate the photocatalytic material;
at least one gear;
a motor, wherein the motor is operably connected to the at least one gear; and
a battery, wherein the battery is operably connected to the motor.

2. The window blind of claim 1, further comprising a controller, the controller comprising a memory for storing program code.

3. The window blind of claim 1, wherein the photocatalytic material comprises one or more of the following: titanium dioxide, stannous oxide, and zinc oxide.

4. The window blind of claim 3, wherein the photocatalytic material is doped with tungsten trioxide.

5. The window blind of claim 3, wherein the photocatalytic material is doped with a metal cation.

6. The window blind of claim 5, wherein the metal cation is selected from one or more of the following: sliver, iron, cobalt, chromium, and manganese.

7. The window blind of claim 1, further comprising a second lip, wherein the second lip defines an indentation substantially along the second horizontal edge of each of the plurality of slats.

8. The window blind of claim 7, wherein each of the plurality of slats further comprises a convex surface such that water collecting on the convex surface moves towards the first and second lips.

9. A window blind comprising:
a plurality of slats, each of the plurality of slats comprising:
a first horizontal edge and a second horizontal edge, wherein the first and second horizontal edges are substantially parallel with a horizontal axis of each of the plurality of slats;
a lip, along the first horizontal edge of each of the plurality of slats;
a substrate;
a film of photocatalytic material, wherein the film is disposed on the substrate;
a bottom rail, the bottom rail comprising an ultraviolet light source, wherein the ultraviolet light source directs ultraviolet light upward toward the plurality of slats to activate the photocatalytic material;
a headrail, the headrail comprising:
at least one gear;
motor, wherein the motor is operably connected to the at least one gear; and
a battery, wherein the battery is operably connected to the motor.

10. The window blind of claim 9, further comprising a controller, the controller comprising a memory for storing program code.

11. The window blind of claim 9, wherein the photocatalytic material comprises one or more of the following: titanium dioxide, stannous oxide, and zinc oxide.

12. The window blind of claim 11, wherein the photocatalytic material is doped with tungsten trioxide.

13. The window blind of claim 11, wherein the photocatalytic material is doped with a metal cation.

14. The window blind of claim 13, wherein the metal cation is selected from one or more of the following: sliver, iron, cobalt, chromium, and manganese.

15. The window blind of claim 9, further comprising a second lip, wherein the second lip defines an indentation substantially along the second horizontal edge of each of the plurality of slats.

16. The window blind of claim 15, wherein each of the plurality of slats further comprises a convex surface such that water collecting on the convex surface moves towards the first and second lips.

17. The window blind of claim 9, wherein each slat is sequentially exposed to the ultraviolet light as the window blind is raised.

18. The window blind of claim 17, wherein the slats stack up from the bottom as the blind is raised with the lowest slat that is not stacked being positioned nearest the ultraviolet light source in the bottom rail.

19. The window blind of claim 9 further comprising a shield.

20. The window blind of claim 19, wherein the shield is angled over the ultraviolet light source.

* * * * *